(12) United States Patent
Paul et al.

(10) Patent No.: US 8,540,190 B2
(45) Date of Patent: Sep. 24, 2013

(54) CONNECTING ARRANGEMENT COMPRISING A COUPLING ELEMENT AND TWO CURVED RIBS OF AN AIRCRAFT OR SPACECRAFT

(75) Inventors: Carsten Paul, Garstedt (DE); Marc Schimmler, Heinbockel (DE)

(73) Assignee: Airbus Operations GmbH, Hamburg (DE)

( * ) Notice: Subject to any disclaimer, the term of this patent is extended or adjusted under 35 U.S.C. 154(b) by 466 days.

(21) Appl. No.: 12/597,027

(22) PCT Filed: May 2, 2008

(86) PCT No.: PCT/EP2008/055428
§ 371 (c)(1),
(2), (4) Date: Jan. 13, 2010

(87) PCT Pub. No.: WO2008/135533
PCT Pub. Date: Nov. 13, 2008

(65) Prior Publication Data
US 2010/0148009 A1    Jun. 17, 2010

Related U.S. Application Data
(60) Provisional application No. 60/927,717, filed on May 4, 2007.

(30) Foreign Application Priority Data
May 4, 2007  (DE) .......................... 10 2007 021 075

(51) Int. Cl.
*B64C 1/06* (2006.01)

(52) U.S. Cl.
USPC .......................................... 244/131; 244/119

(58) Field of Classification Search
USPC ......... 244/119, 120, 123.1, 131, 132; 52/630
See application file for complete search history.

(56) References Cited

U.S. PATENT DOCUMENTS

| | | | | |
|---|---|---|---|---|
| 1,766,961 A | * | 6/1930 | Steuart | 244/119 |
| 1,803,494 A | | 5/1931 | Amiot | |
| 1,885,406 A | * | 11/1932 | Bechereau | 29/462 |
| 1,922,063 A | * | 8/1933 | Vaughn | 29/462 |
| 5,518,208 A | * | 5/1996 | Roseburg | 244/132 |

(Continued)

FOREIGN PATENT DOCUMENTS

| | | |
|---|---|---|
| DE | 602004013296 | 5/2009 |
| GB | 368367 | 3/1932 |
| RU | 2249538 | 10/2005 |

OTHER PUBLICATIONS

Chinese Office Action, Mar. 25, 2013.

(Continued)

*Primary Examiner* — Philip J Bonzell
(74) *Attorney, Agent, or Firm* — Greer, Burns & Crain Ltd.

(57) ABSTRACT

A connecting device having two curved ribs of an aircraft or spacecraft, with: a coupling element which can be connected by means of predetermined coupling sections to respective connecting sections of the two ribs; wherein at least the predetermined coupling sections of the coupling element are rectilinearly designed; and wherein at least the respective connecting sections of the two ribs each have rectilinearly running inner belt regions for a respective rectilinear connection of the predetermined coupling sections of the coupling element.

8 Claims, 5 Drawing Sheets

(56) References Cited

U.S. PATENT DOCUMENTS

| | | | |
|---|---|---|---|
| 5,806,797 A * | 9/1998 | Micale | 244/120 |
| 6,543,721 B2 | 4/2003 | Palm | |
| 7,686,249 B2 * | 3/2010 | Luttig et al. | 52/630 |
| 7,823,362 B2 * | 11/2010 | Meyer | 52/713 |
| 7,938,367 B2 * | 5/2011 | Jarsaillon et al. | 244/131 |
| 2006/0237587 A1 | 10/2006 | Luttig et al. | |
| 2008/0067289 A1 * | 3/2008 | Meyer | 244/131 |

OTHER PUBLICATIONS

Russian Office Action, 2012.
Theoretical fundamentals of aircraft and rocket engineering, 2005, Cited in Russian Office Action.
German Office Action, Oct. 11, 2011.

* cited by examiner (A-A)

CONNECTING ARRANGEMENT COMPRISING A COUPLING ELEMENT AND TWO CURVED RIBS OF AN AIRCRAFT OR SPACECRAFT

CROSS-REFERENCE TO RELATED APPLICATIONS

This application claims the benefit of U.S. Provisional Application No. 60/927,717, filed May 4, 2007 and German Patent Application No. 10 2007 021 075.4, filed May 4, 2007, the entire disclosures of which are herein incorporated by reference.

FIELD OF THE INVENTION

This invention relates to a connecting arrangement comprising a coupling element and two curved ribs of an aircraft or spacecraft.

Such connecting arrangements are used for connecting curved ribs in aircraft and spacecraft, particularly in the spherical fuselage region. In a rib plane which runs perpendicularly to the longitudinal axis of an aircraft, for example, two or even a plurality of rib parts are connected together to form an entire rib according to the radius of the fuselage in this plane.

FIG. 5 shows a representation of a connecting device known to the applicant for connecting two curved ribs 1 and 2. A longitudinal axis of the associated aircraft or spacecraft, not shown, on one inner side 4, is perpendicular to the drawing plane. Each of the ribs has an inner edge with an inner belt 14, which has an inner radius R1, R2. In the radial direction towards an outer side 3, rib 1, 2 expands over its rib height H1, H2 as far as the start of its outer belt 13. Outer belt 13 has recesses through which run stringers 9, 11. An outer skin 12 of the aircraft or spacecraft is provided on outer belt 13. Both ribs 1, 2 are each provided with a connecting section V1, V2 in a connecting region 16 at each of their ends, in which section is installed a coupling element 5, by means of fastening elements 8, which element enables the two ribs 1, 2 to be connected. Coupling element 5 is designed on its lower edge with the same contour which inner belts 14 of ribs 1, 2 have.

A specially adapted coupling element must be designed and produced for each inner radius at the same and at a variable rib height. This applies both to coupling elements and plate couplings (RP=reformed plastic) parts of extruded material as well as to coupling elements cut from aluminium sheets.

Disadvantages of such coupling elements are the multiplicity of parts and the high production costs, for example for reforming blocks for plate coupling elements (RP parts) or drawing blocks for extruded couplings, followed by the cost of straightening, as well as the milling cutting of coupling elements of aluminium sheets with a high material loss. In addition there is the long time taken to produce all coupling elements.

A further significant disadvantage consists in the fact that a new coupling element, adapted to the inner radius, must be produced for every modified inner contour.

SUMMARY OF THE INVENTION

Against this background the object of the present invention is to provide a connecting arrangement which removes or significantly reduces the above-mentioned disadvantages.

According to the invention this object is achieved by a connecting arrangement with the features of claim 1.

Accordingly a connecting arrangement is provided comprising a coupling element and two curved ribs of an aircraft or spacecraft, the coupling element being connectable by means of predetermined coupling sections to respective connecting sections of the two ribs, wherein at least the predetermined coupling sections of the coupling element are of a rectilinear design, and wherein at least the respective connecting sections of the two ribs have rectilinearly running inner belt regions for each rectilinear connection of the predetermined coupling sections of the coupling element.

This invention therefore has the advantage that the connecting arrangement is designed with rectilinear connecting sections of the ribs to be connected with a straight, easily produced and hence favourable coupling element, which reduces the associated production and straightening costs considerably.

Because of the rectilinear design of the connecting sections of the curved ribs to be connected as a non-curved, rectilinear inner belt region, the same geometries of the coupling unit can be used in different fuselage positions of an aircraft or spacecraft.

Advantageous embodiments and improvements of the present invention can be found in the dependent claims.

In a preferred embodiment provision is made for a transition of each rectilinearly running inner belt region of the connecting arrangement into the contour of each inner belt with an inner radius to have a transition radius. In this case a relatively large radius, for example greater or equal to 1000 mm, is selected as the transition radius. Consequently stress concentrations in the ribs and coupling elements are advantageously avoided.

In a further embodiment provision is made, in the case of curved ribs to be connected which each have inner belts with inner radii of different sizes, for rectilinearly running inner belt regions of the connecting sections to be sections of a tangent of the larger arc section of the arc sections to the inner radii. It is therefore also possible to use simple coupling elements with rectilinear coupling sections which are simple to produce at low cost, the tangent running at an angle to a perpendicular which runs perpendicularly in the centre of the connecting sections through an outer skin of the aircraft or spacecraft.

In a further embodiment the rectilinearly running inner belt can be constructed in the connecting sections so that it is designed as a section of a tangent of an arc of a connecting radius, which section has a radius which is smaller by a certain value than the value of the inner radii of the ribs to be connected. Here this tangent runs at right angles to a perpendicular which runs in the centre of the connecting sections perpendicularly through an outer skin of the aircraft or spacecraft. It is particularly advantageous for this determined value to be the same for all devices for connecting curved ribs present in an aircraft or spacecraft. Therefore a rectilinear simple coupling element can be used several times for this purpose, even if the inner radii are varied, thereby considerably reducing the multiplicity of parts.

The coupling elements can be formed from sections of an extruded profile that are cut to length or are cut to length and machined. Such an extruded profile is easy to cut to length and is obtainable in many versions, for example in fatigue resistant alloys. This eliminates the disadvantages of plate coupling elements with a constant thickness, for the advantage of the extruded profiles to be dimensioned thus lies in the fact that they do not have to be milled in terms of thickness and shape.

It is also possible to design the coupling element as a simple plate edge part of constant thickness.

In an alternative embodiment provision is made for the coupling element to be designed as a milled part, or for it to consist of a combination of a cut to length part and a machined part, thereby increasing its scope of application.

The invention is explained in greater detail in the following with reference to the exemplary embodiment represented in the diagrammatic figures in the drawing.

BRIEF DESCRIPTION OF THE DRAWINGS

Here.

DESCRIPTION OF EXEMPLARY EMBODIMENTS

Figure 1:
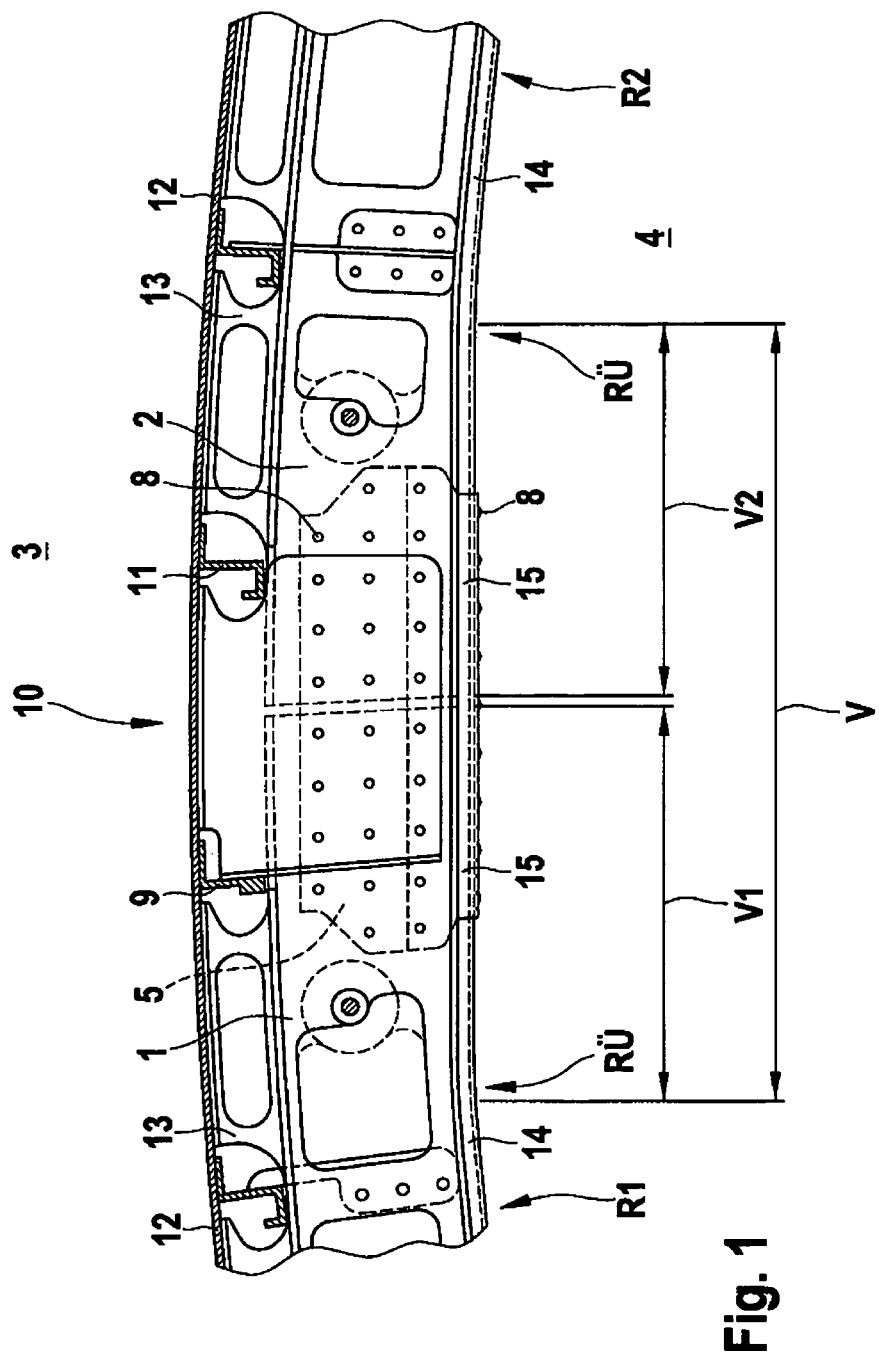
FIG. 1 shows a partial view of a first exemplary embodiment of an inventive arrangement comprising two curved ribs of an aircraft or spacecraft.

In all figures of the drawing the same or functionally similar elements have been provided with the same reference symbols, unless otherwise indicated.

Figure 5:
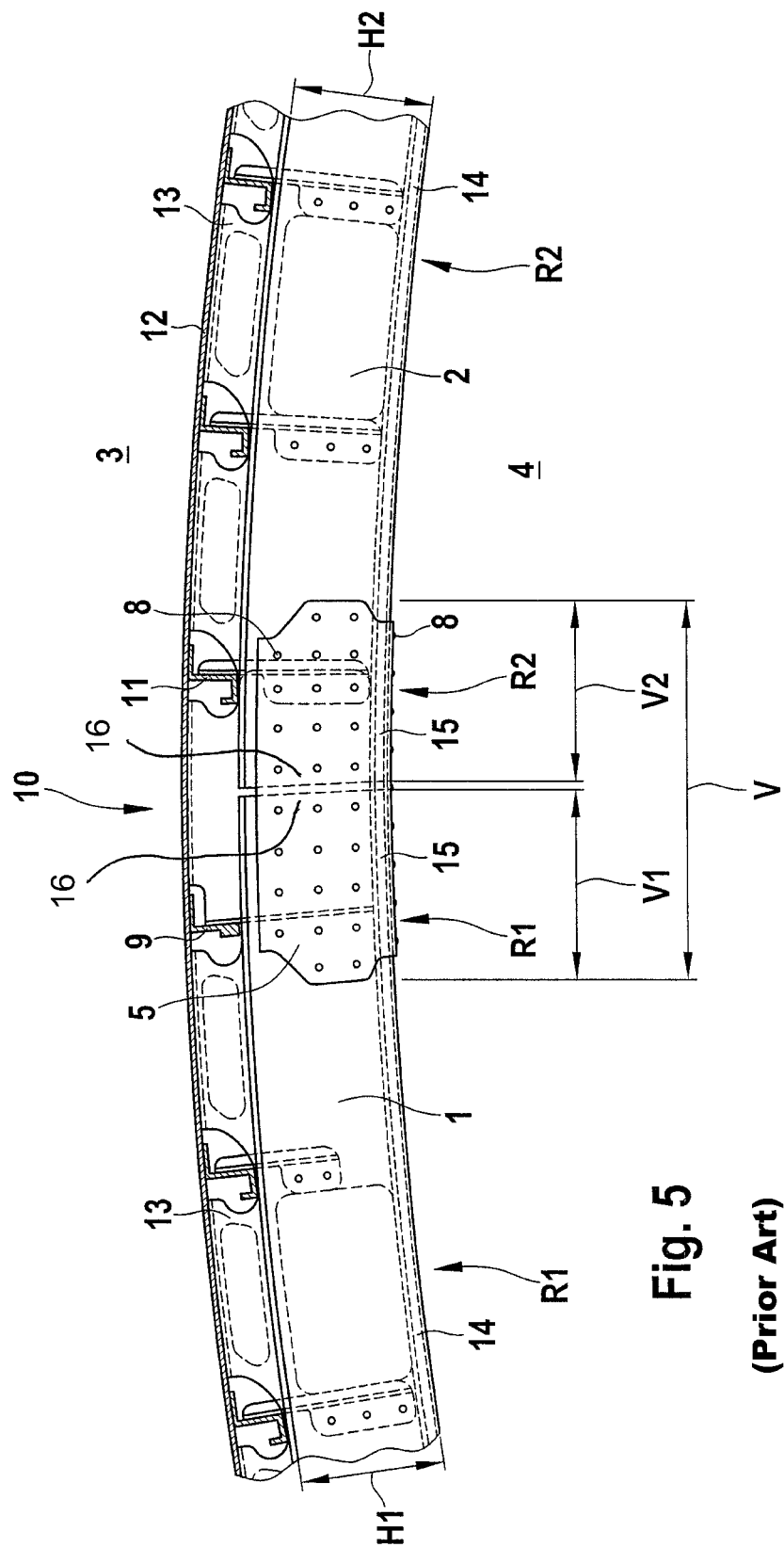
FIG. 5 shows a partial view of an arrangement connecting two curved ribs of an aircraft or spacecraft according to the state of the art.

A connecting arrangement according to the state of the art has already been explained in connection with FIG. 5 in the introduction to the description with basic elements also used in the further figures.

FIG. 1 shows a partial view of a first exemplary embodiment of an inventive connecting device of two curved ribs 1, 2 of an aircraft or spacecraft.

Both ribs 1, 2 each have an inner belt 14 with an inner radius R1, R2. In this first exemplary embodiment both inner radii R1, R2 are essentially of the same size. Ribs 1, 2 are connected by means of a coupling element 5 at their ends in a connecting region 10, wherein the ends of ribs 1, 2 are arranged opposite each other at a certain distance. This gap thus formed is covered by coupling element 5.

Connecting region 10 lies in the region of two stringers 9 and 11 and has a connecting region length V, which is divided into two connecting sections V1 and V2. In this connecting region V the contour of inner belt 14 of both ribs 1, 2 is formed so that it runs rectilinearly in an inner belt region 15.

Coupling element 5, which is explained in more detail later, is fastened in connecting sections V1, V2 to ribs 1, 2 by means of fastening elements 8, rivets for example, with coupling surfaces 6, 7 (see FIG. 3), and therefore forms a connection between the two ribs 1, 2. Coupling element 5 has a lower edge which is designed so that it runs rectilinearly corresponding to the rectilinear inner belt region 15.

The contours of inner belts 14 with inner radii R1, R2 pass into rectilinear inner belt region 15 via transition radii RU. Stress concentrations in ribs 1, 2 and coupling element 5 are avoided by means of transition radius RU. Transition radius RU is selected with a value of approximately 1000 mm or greater. This is a value determined by tests carried out by the applicant.

Figure 2:
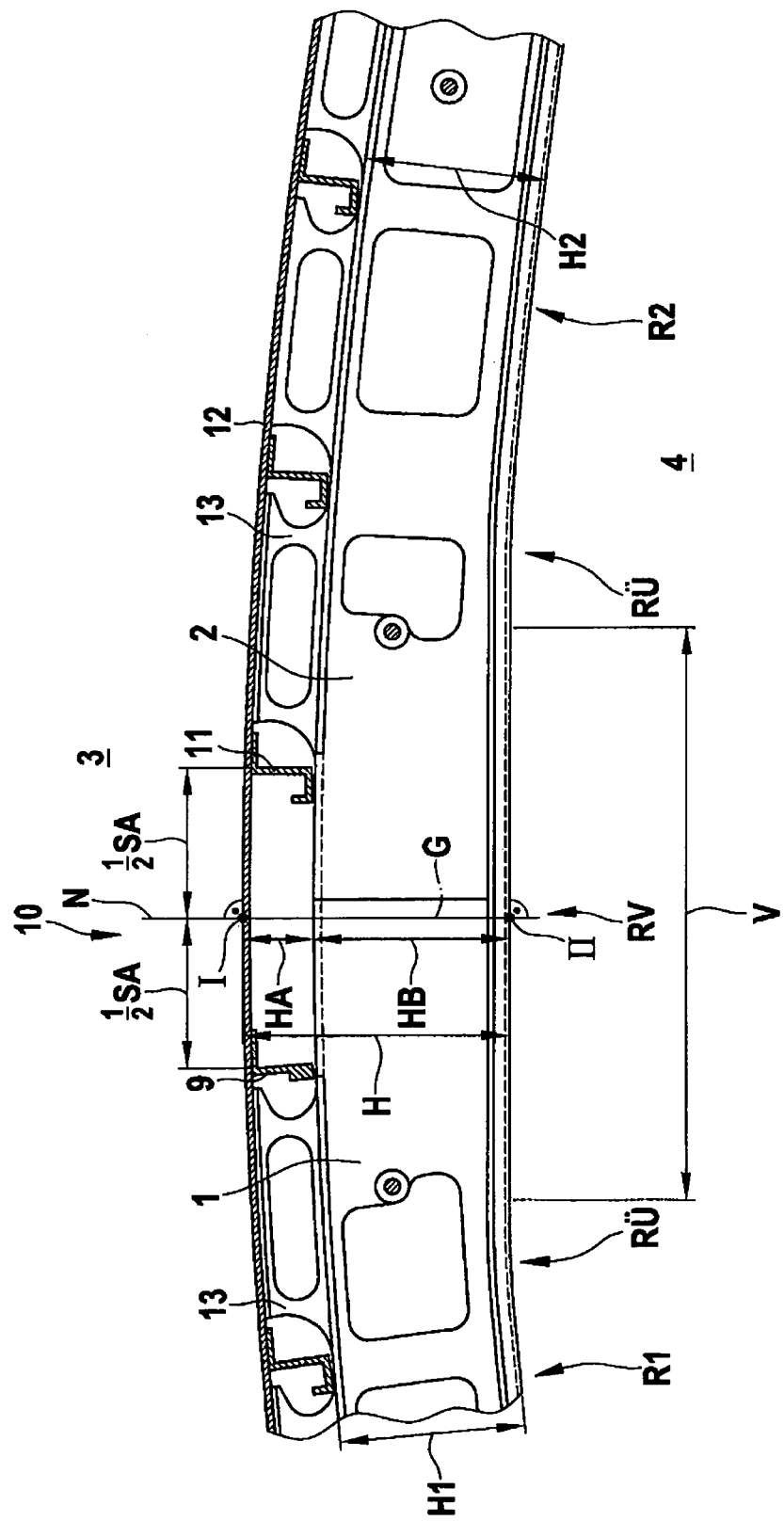
FIG. 2 shows a partial view of the connecting arrangement according to FIG. 1 without a coupling element.

An exemplary design of the rectilinearly running inner belt region 15 in connecting sections V1, V2 on the ends of curved ribs 1, 2 to be connected is described in connection with FIG. 2 and a design of a so-called rib height geometry which shows a partial view of the inventive connecting arrangement according to FIG. 1 without coupling element 5.

The rib height geometry in connecting region 10 is established centrally between two stringers 9, 11 (half stringer distance SA) at right angles to inner belt region 15 at a height dimension H. For this purpose a perpendicular N is erected at the point of intersection I of half stringer distance ½ SA with outer skin 12, on which height dimension H is removed at this point of intersection I towards inner side 4. At a point of intersection II of perpendicular N at a distance H from first point of intersection I a straight line G is constructed at right angles to the perpendicular. This straight line G forms the basis of the rectilinear course of inner contour region 15 of connecting region 10. Straight line G is at the same time tangential to a connecting radius RV at point of intersection II.

Height dimension H is composed of height dimension HA of the outer belt and a height dimension HB:

$$H = HA + HB$$

Height dimension HB is a sum of rib height H1, 2 and a height difference HD:

$$HB = H1,2 + HD$$

For height difference HD a value is selected which is dimensioned so that it is the same size for all the inner rib radii used in an aircraft or spacecraft. The advantage of this is that the same geometries can be used in all rib connecting arrangements, regardless of the inner radii, as a result of which all coupling elements 5 can have the same geometries.

The value of height difference HD can be determined by tests. For example, the applicant has determined a value for height difference HD=8 mm in an aircraft with rib heights H1, H2 of 120, 160 and 190.

Height difference HD is also the value by which connecting radius RV is smaller than inner radius R1, R2.

Figure 3A:
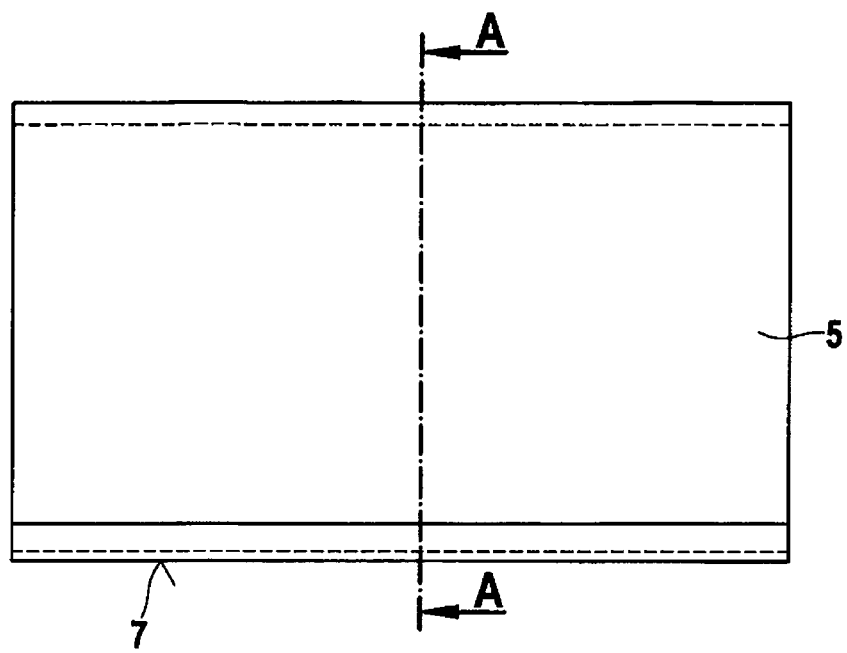
FIG. 3a shows an exemplary embodiment of a coupling element in a side view.
Figure 3B:
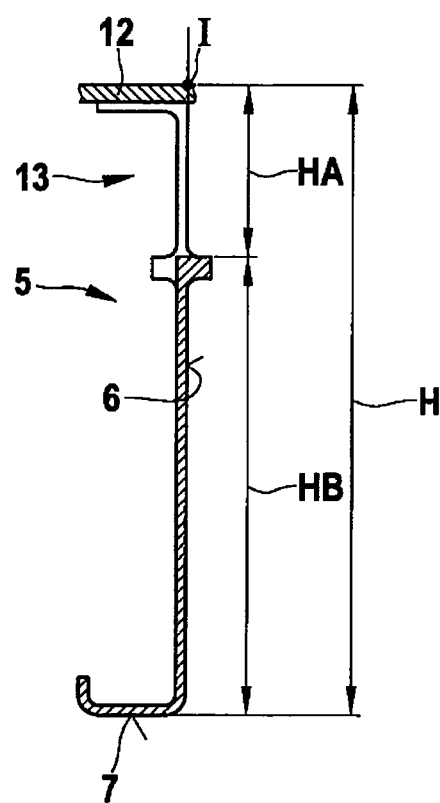
FIG. 3b shows an exemplary embodiment of the coupling element according to FIG. 3b in a cross-sectional view along line A-A in FIG. 3b.

FIG. 3a represents an exemplary coupling element 5 in a side view and FIG. 3 represents a section through coupling element 5 along line A-A in FIG. 3b.

Coupling element 5 is shown in side view in FIG. 3a in a simple rectangular design. The transverse sides may also have a different shape, as shown for example in FIGS. 1 and 2.

Coupling element 5 is formed in this example with an L-shaped cross-section which corresponds to connecting sections V1, V2 of ribs 1, 2, as shown in FIG. 3b. A coupling region 6 of coupling element 5 forms a long leg of the L-shaped cross-section and has the height dimension HB. This coupling surface 6 serves as the connection to the rib at height H1, H2. A second coupling surface 7 forms the short leg of the L-shaped cross-section of coupling element 5 and is formed rectilinearly in the longitudinal direction corresponding to the rectilinear inner belt region 15 of connecting sections V1, V2 of ribs 1, 2. This means that a longitudinal axis of coupling surface 7 runs parallel to a longitudinal axis of coupling surface 6, both coupling surfaces 6 and 7 being at right angles to each other.

This shape of coupling element 5 is simple to cut to length, for example from an extruded profile. Additional machining for shaping the transverse sides is possible by milling cutting or the like. However, machining of the upper longitudinal edge, so that it runs at an angle and not parallel to the longitudinal axis of coupling surface 7, is also conceivable for producing the shape shown in FIG. 4. In this case the initial shape of coupling element 5 may have a simple rectangular cross-section.

Figure 4:
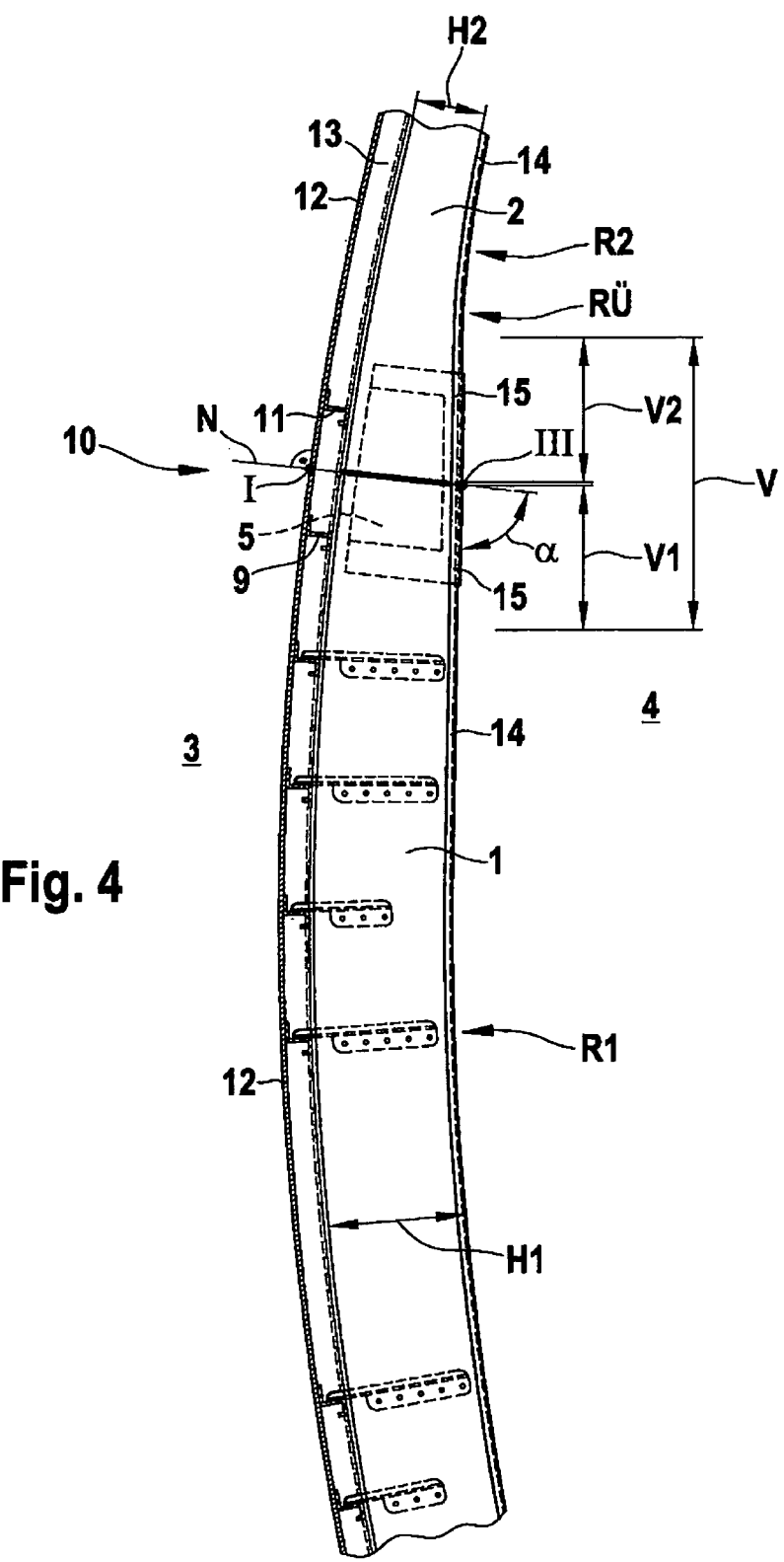
FIG. 4 shows a partial view of a second exemplary embodiment of an inventive connecting arrangement.

FIG. 4 shows a partial view of a second exemplary embodiment of an inventive arrangement for connecting two curved ribs 1, 2. Inner radii R1, R2 of both ribs are in this case of different sizes, inner radius R2 being smaller than R1.

In this case the respective rectilinearly running inner belt regions 15 of connecting sections V1, V2 are sections of a tangent of the larger arc section of the arc sections with inner radii R1, R2. In order to design the rectilinearly running inner belt region 15 and to produce the rib height geometry, perpendicular N is also erected at point of intersection I on outer skin 12, as described in FIG. 2. Furthermore, a tangent is placed on the arc section with the larger inner radius of inner radii R1 and R2 (here R1), which in the connecting arrangement shown in FIG. 4 intersects with perpendicular N at a point of intersection III and with the arc section with the smaller inner radius R2. The distance between the two points of intersection I and II on perpendicular N is a dimension which has the same composition as height dimension H (see FIG. 2), but the value may be different for a height difference. In the case of a value of the distance between the two points of intersection I and II on perpendicular N, determined by tests, and hence the corresponding height difference, the direction of the tangent, i.e. of rectilinear inner contour region 15, can therefore be established. However, this tangent does not intersect at right angles with perpendicular N at point of intersection III but at a certain angle α.

A resultant point of intersection IV of this tangent with the arc section with the smaller inner radius R2 is rounded out with transition radius RV. In this case this tangent forms the rectilinearly running inner belt region 15 of connecting sections V1, V2. It is also possible to select this tangent so that it is at the same time the tangent on both arc sections.

The invention is not limited to the exemplary embodiments described above.

For example, it is also conceivable for coupling element 5 to be connected on both sides in connecting region 10.

Coupling element 5 may be a bent plate part, which is particularly advantageous in the second exemplary embodiment. Moreover, a bent plate part can be easily produced, to particular advantage, because of the rectilinearity.

LIST OF REFERENCE NUMERALS

1 First rib
2 Second rib
3 Outer side
4 Inner side
5 Coupling element
6 First coupling region
7 Second coupling region
8 First fastening element
9 First stringer
10 Connecting region
11 Second stringer
12 Outer skin
13 Outer belt
14 Inner belt
15 Inner belt region
I, II Point of intersection
G Straight line
H, HA, HB Height dimension
HD Height difference
H, H2, H2' Rib height
N Perpendicular
R1; R2 Inner radius
RU Transition radius
RV Connecting radius
SA Distance between stringers
V Connecting region length
V1; V2 Connecting section
α Angle

The invention claimed is:

1. A connecting arrangement comprising a coupling element and two curved ribs of an aircraft or spacecraft, the curved ribs comprising respective inner belts and outer belts, the coupling element being connectable by means of predetermined coupling sections to respective connecting sections of the two ribs, the respective outer belts, in the region of the respective connecting sections, having a curvature corresponding to a curvature of an outer skin of the aircraft or spacecraft, and abutting on the outer skin of the aircraft or spacecraft, wherein at least the respective connecting sections of the two ribs each have inner belt regions running rectilinearly in a longitudinal direction of said ribs for a respective rectilinear connection of the predetermined coupling sections of the coupling element; and wherein at least the predetermined coupling sections of the coupling element are rectilinearly formed in a longitudinal direction.

2. The connecting arrangement according to claim 1, wherein the predetermined rectilinearly designed coupling sections of the coupling element have surfaces which run essentially perpendicularly to each other or at an angle to each other.

3. The connecting arrangement according to claim 1, wherein the coupling element is formed from sections of an extruded profile that have been cut to length and/or machined.

4. The connecting arrangement according to claim 1, wherein the coupling element is designed as a milled part.

5. The connecting arrangement according to claim 1, wherein a transition of each of the rectilinearly running inner belt regions of the connecting sections into the contour of the respective inner belt with an inner radius has a transition radius.

6. The connecting arrangement according to claim 5, wherein in the case of curved ribs to be connected, which have respective inner belts with inner radii of different sizes, the respective rectilinearly running inner belt regions of the connecting sections form sections of a tangent of the larger arc section of arc sections with the inner radii of the inner belts, and wherein the tangent runs at an angle to a perpendicular, which runs approximately in the centre of the connecting sections perpendicularly through the outer skin of the aircraft or spacecraft.

7. The connecting arrangement according to claim 5, wherein in the case of curved ribs to be connected, which have respective inner belts with inner radii of the same size, the respective rectilinearly running inner belt regions of the connecting sections form sections of a tangent of an arc section with a connecting radius which is smaller by a predetermined value than the value of the inner radii, and wherein this tangent runs at right angles to a perpendicular which runs in the centre of the connecting sections perpendicularly through an outer skin of the aircraft or space vehicle.

8. The connecting arrangement according to claim 7, wherein the value is of the same size in all connecting arrangements for connecting curved ribs present in an aircraft or spacecraft.

* * * * *